(12) United States Patent
Hama

(10) Patent No.: US 12,125,259 B2
(45) Date of Patent: Oct. 22, 2024

(54) INFORMATION PROCESSING APPARATUS FOR DETERMINING PRESENCE OF A FAULT IN IMAGE DATA IN ACCORANCE WITH A SIZE OF CHARACTERS

(71) Applicant: FUJIFILM BUSINESS INNOVATION CORP., Tokyo (JP)

(72) Inventor: Daigo Hama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 444 days.

(21) Appl. No.: 17/587,446

(22) Filed: Jan. 28, 2022

(65) Prior Publication Data
US 2023/0101897 A1   Mar. 30, 2023

(30) Foreign Application Priority Data
Sep. 28, 2021   (JP) .................. 2021-157885

(51) Int. Cl.
| | | |
|---|---|---|
| *G06V 10/25* | (2022.01) | |
| *G06T 7/11* | (2017.01) | |
| *G06T 7/13* | (2017.01) | |
| *G06T 7/73* | (2017.01) | |
| *G06V 10/44* | (2022.01) | |
| *G06V 10/75* | (2022.01) | |

(52) U.S. Cl.
CPC ............ *G06V 10/759* (2022.01); *G06T 7/11* (2017.01); *G06T 7/13* (2017.01); *G06T 7/74* (2017.01); *G06V 10/25* (2022.01); *G06V 10/44* (2022.01); *G06V 10/751* (2022.01)

(58) Field of Classification Search
CPC ... G06F 3/121; G06F 3/1234; H04N 1/00037; H04N 1/00042; H04N 1/00087; H04N 1/00047; H04N 1/00063; G06T 7/001; G06T 7/11; G06T 7/13; G06T 2207/30176
See application file for complete search history.

(56) References Cited

U.S. PATENT DOCUMENTS

| | | | | |
|---|---|---|---|---|
| 9,620,086 | B1* | 4/2017 | Joshi | .......... G09G 5/28 |
| 2012/0102388 | A1* | 4/2012 | Fan | .......... G06F 40/117 |
| | | | | 715/234 |
| 2017/0169798 | A1* | 6/2017 | Chang | .......... G09G 5/26 |
| 2018/0293732 | A1* | 10/2018 | Oki | .......... G06T 7/001 |
| 2019/0174013 | A1* | 6/2019 | Yamanaka | ......... H04N 1/00037 |
| 2020/0058115 | A1* | 2/2020 | Mimura | ............ H04N 1/00005 |
| 2020/0304683 | A1* | 9/2020 | Tatsumi | ................ G06N 20/00 |
| 2021/0256677 | A1* | 8/2021 | Kobashi | ................ G06V 30/40 |
| 2022/0046144 | A1* | 2/2022 | Sakai | ...................... H04N 1/58 |

FOREIGN PATENT DOCUMENTS

JP   6323190 B2   5/2018

* cited by examiner

*Primary Examiner* — Benjamin O Dulaney
(74) *Attorney, Agent, or Firm* — Oliff PLC

(57) ABSTRACT

An information processing apparatus includes a processor configured to: acquire information indicating a size of an external shape of each of characters in data of a first image and data of a second image that are used for comparison; and determine a presence or absence of a fault in the data of the second image with respect to each of the characters with reference to a degree of a difference that is between the data of the second image and the data of the second image and is detected in accordance with a detection condition varying in response to the size of the external shape of each of the characters.

3 Claims, 7 Drawing Sheets

FIG. 6

| CHARACTER SIZE THRESHOLD | DETECTION CONDITION OF DIFFERENCE WHEN CHARACTER SIZE IS EQUAL TO OR SMALLER THAN THRESHOLD |
|---|---|
| 8-POINT | DIFFERENCE IS SET TO BE EASIER TO RECOGNIZE |
| 8-POINT | EDGE OF CHARACTER IS EXTRACTED MORE ACCURATELY |
| 8-POINT | THRESHOLD OF PIXEL VALUE OF PIXEL RECOGNIZED AS PART OF CHARACTER IS INCREASED |
| 8-POINT | WHITE VOID IS DETECTED |

| CHARACTER SIZE | CORRECT-ANSWER IMAGE | EXAMINATION TARGET IMAGE | EXPANDED VIEW OF DECIMAL POINT |
|---|---|---|---|
| ABOVE THRESHOLD | 8.24 | 8.24 | |
| EQUAL TO OR BELOW THRESHOLD | 8.24 | 8.24 | |
| | | 8.24 | |

INFORMATION PROCESSING APPARATUS FOR DETERMINING PRESENCE OF A FAULT IN IMAGE DATA IN ACCORANCE WITH A SIZE OF CHARACTERS

CROSS-REFERENCE TO RELATED APPLICATIONS

This application is based on and claims priority under 35 USC 119 from Japanese Patent Application No. 2021-157885 filed Sep. 28, 2021.

BACKGROUND

(i) Technical Field

The present disclosure relates to an information processing apparatus, an information processing system, and a non-transitory computer readable medium.

(ii) Related Art

Images printed by printer are typically examined after a printing process. Techniques of reducing detection error in the examination are disclosed (for example, see Japanese Patent No. 6323190). In the examination, data on images serving print targets is compared with scan data on a printed image under a uniformly set detection condition. A fault, such as a smudge or white void, which may occur in the printed image may thus be detected.

The detection of a fault is more difficult as the size of an external shape of an examination target is reduced. For example, the detection of a fault may not necessarily be performed accurately depending on the font size of characters included in the image. On the other hand, as the font size decreases, the characters included in the image may be more valuable as information. The detection of a fault may be to be accurately performed regardless of the font size.

SUMMARY

Aspects of non-limiting embodiments of the present disclosure relate to reducing the possibility of detection failure of a fault, such as a smudge or white void present in an image, in comparison with when the size of an external shape of characters is not accounted for.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire information indicating a size of an external shape of each of characters in data of a first image and data of a second image that are used for comparison; and determine a presence or absence of a fault in the data of the second image with respect to each of the characters with reference to a degree of a difference that is between the data of the second image and the data of the second image and is detected in accordance with a detection condition varying in response to the size of the external shape of each of the characters.

BRIEF DESCRIPTION OF THE DRAWINGS

Exemplary embodiment of the present disclosure will be described in detail based on the following figures, wherein:

FIG. 6 specifically illustrates a relationship between the threshold of a size of an external shape of a character and a detection condition of a set difference; and FIG. 7 specifically illustrates specific examples of a difference detected by the image processing apparatus and a fault in a printing process.

DETAILED DESCRIPTION

Exemplary embodiment of the disclosure is described below with reference to the drawings.

Configuration of Information Processing System

Figure 1:
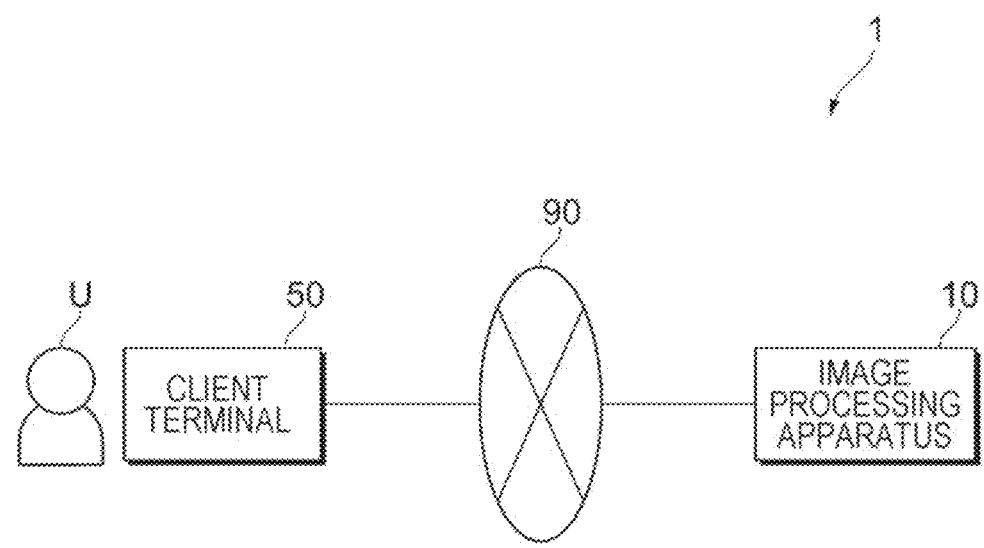
FIG. 1 illustrates an entire configuration of an information processing system of the exemplary embodiment.

FIG. 1 illustrates an entire configuration of an information processing system 1 of the exemplary embodiment. The information processing system 1 includes an image processing apparatus 10, client terminal 50, and network 90 that interconnects the image processing apparatus 10 to the client terminal 50. For example, the network 90 is a local-area network (LAN), the Internet, or the like. The image processing apparatus 10 may be connected to the client terminal 50 not via the network 90 but via direct connection, such as via infrared communications, visible light communications, near-field communications, Bluetooth (registered trademark), or radio frequency identifier (RFID (registered trademark)). Referring to FIG. 1, the single client terminal 50 is illustrated. Alternatively, multiple client terminals 50 may be connected to the network 90.

The image processing apparatus 10 is an information processing apparatus that has, as basic functions, a function of forming an image on a recording medium, a function of reading an image on a recording medium, and a function of transmitting and/or receiving image information via communications. The image information transmitted and/or received by the image processing apparatus 10 includes data on an image serving as a target to be formed on a recording medium and information used to form the image on a recording medium. The information used to form the image on the recording medium includes, for example, a size of the recording medium to be output, a color mode in which the image is formed (such as full color or monochrome), and the number of prints to be output. According to the exemplary embodiment, the recording medium is a paper sheet.

After performing a printing process to form an image on a paper sheet as a recording medium, the image processing apparatus 10 examines whether the printing process has been successfully completed. Specifically, with data on a print target image being as data on a correct-answer (the correct-answer image data) and with image data generated through the printing process of reading an image printed on a paper sheet being data on an examination target image (the examination target image data), the image processing apparatus 10 compares the correct-answer image data with the examination target image data. The image processing apparatus 10 determines the presence or absence of a fault in the printing process in accordance with a difference as a result of the comparison of the data. The detection of the difference is typically performed under a predetermined detection condition. The detection condition varies in response to the size of the external shape of characters included in the examination target image data. The fault in the printing process may include a "smudge" of ink sticking to an unintended location, a "white void" as a missing portion of the printed character, or a "blur" as insufficient printing.

The image processing apparatus 10 performs the following operations in the examination. Specifically, the image processing apparatus 10 acquires the data on the correct-answer image (the correct-answer image data) as data of a first image serving as a comparison target and the data on the examination target image (the examination target image data) serving as data of a second image. The image processing apparatus 10 also acquires information indicating the size of the external shape of each of characters included in the correct-answer image data and examination target image data. The image processing apparatus 10 determines the presence or absence of a fault in the printing process in accordance with the difference that is between the correct-answer image data and examination target image data and is detected through the detection condition that varies in response to the size of the external shape of the character. The printing process performed by the image processing apparatus 10 is specifically described later.

The client terminal 50 is an information processing apparatus, operated by a user U, and may be a personal computer, tablet terminal, or smart phone. In response to an operation of the user U, the client terminal 50 generates or acquires data of an image serving as a print target of the image processing apparatus 10. The client terminal 50 causes the image processing apparatus 10 to perform the printing process by transmitting to the image processing apparatus 10 data of an image generated or acquired and information (for example, the size of a paper sheet, color mode, and the number of prints to be output) used for the printing process.

The client terminal 50 receives determination results from the image processing apparatus 10 and then outputs the received determination results. Specifically, the client terminal 50 receives the determination results transmitted from the image processing apparatus 10 and indicating the presence or absence of a fault on each character in the printing process and then outputs the received determination results. For example, the client terminal 50 displays the determination results in a variety of modes visible to the user U.

The functions of the apparatus and terminal forming the information processing system 1 have been for exemplary purposes only. It is acceptable if the information processing system 1 as a whole provides the functions described above. Some or all of the functions described above may be distributed or performed cooperatively within the information processing system 1. For example, Some or all of the functions of the image processing apparatus 10 may be the functions of the client terminal 50. Some or all of the functions of the image processing apparatus 10 may be transferred to a server (not illustrated). In this way, the processes of the whole information processing system 1 may be performed in an improved fashion and in a mutually complementary fashion.

Hardware Configuration of Image Processing Apparatus

Figure 2:
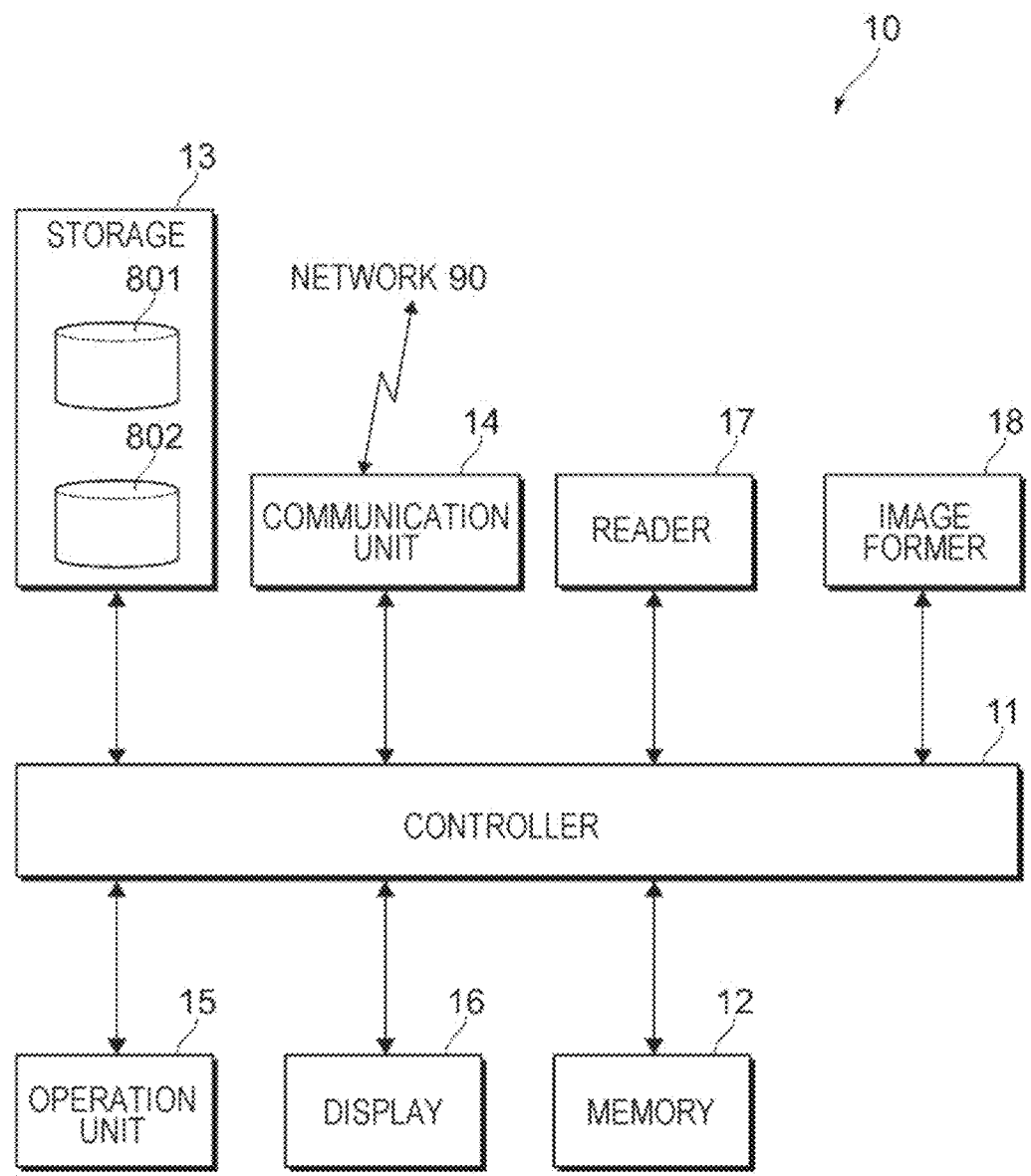
FIG. 2 illustrates a hardware configuration of an image processing system.

FIG. 2 illustrates a hardware configuration of the image processing apparatus 10. The image processing apparatus 10 includes a controller 11, memory 12, storage 13, communication unit 14, operation unit 15, display 16, reader 17, and image former 18. These elements are interconnected to each other via a data bus, address bus, and/or peripheral component interconnect (PCI) bus.

The controller 11 controls the processes of the image processing apparatus 10 by executing a variety of software programs including an operating system (OS) and application software. The controller 11 includes a central processing unit (CPU). The memory 12 stores a variety of software programs and data used to execute the software programs and serves as a working area in arithmetic operations. For example, the memory 12 may be a random-access memory (RAM).

The storage 13 stores data input to the variety of software programs and data output from the variety of software programs. The storage 13 serves as databases (DBs), storing a variety of information, such image DB 801 and detection condition DB 802. The image DB 801 stores the correct-answer image data and the examination target image data. The detection condition DB 802 stores contents of the detection condition used to detect a difference between the correct-answer image data and examination target image data. A specific example of the data stored on the detection condition DB 802 is described below with reference to FIG. 6.

The storage 13 may include a hard disk drive (HDD), solid-state drive (SDD), or semiconductor memory to store programs or a variety of setting data. The communication unit 14 transmits and/or receives data via the network 90 through communications, such as infrared communication. The communication unit 14 transmits and/or receives data with the client terminal 50 and other external apparatus.

The operation unit 15 may include a keyboard, mouse, mechanical buttons, and switches and receive an input operation. The operation unit 15 includes a touch sensor that is integrated with the display 16 to form a touch panel. The display 16 displays an image and text information. The display 16 may include a liquid-crystal display or an electroluminescent (EL) display to display information.

The reader 17 reads an image recorded on a paper sheet as a recording medium. The reader 17 may be a charge-coupled device (CCD) scanner or a contact image sensor (CIS). The CCD scanner contracts with a lens a light beam radiated from a light source to an original document and reflected from the original document and then receives the contracted light beam. The CIS scanner receives a reflected light beam from an original document that is irradiated with a light beam radiated from a light-emitting diode (LED).

The image former 18 forms an image on a recording medium. The image former 18 forms onto a paper sheet as the recording medium the image responsive to image information through an electrophotographic system or an ink-jet system. The electrophotographic system forms a toner image onto a paper sheet. The ink-jet system ejects ink to a paper sheet to form an image on the paper sheet.

Hardware Configuration of Client Terminal

In terms of hardware configuration, the client terminal 50 is identical to the image processing apparatus 10 excluding the reader 17 and image former 18 in FIG. 2. The hardware configuration of the client terminal 50 is thus not illustrated nor described.

Functional Configuration of Controller in Image Processing Apparatus

Figure 3:
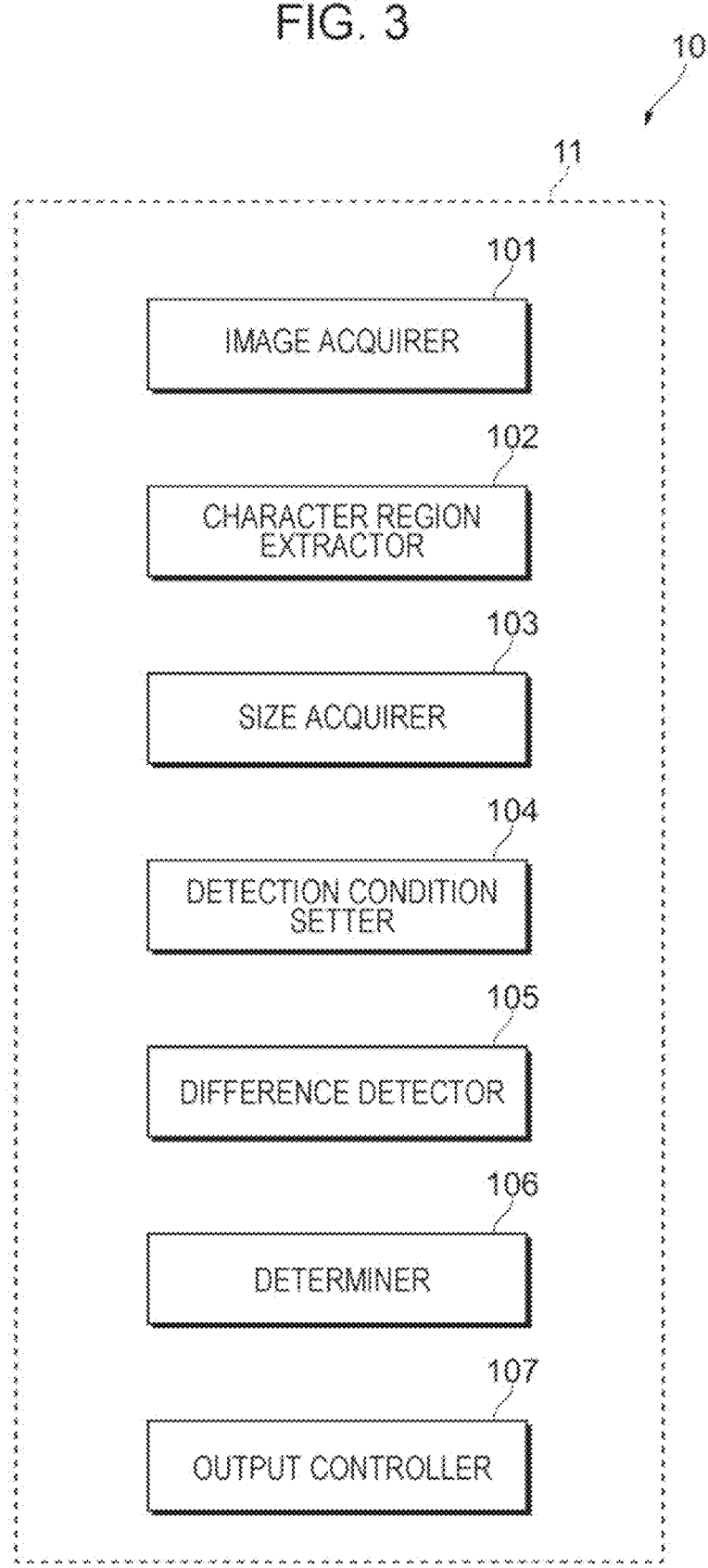
FIG. 3 illustrates a functional configuration of a controller in the image processing apparatus.

FIG. 3 illustrates a functional configuration of the controller 11 in the image processing apparatus 10. The controller 11 in the image processing apparatus 10 includes an image acquirer 101, character region extractor 102, size acquirer 103, detection condition setter 104, difference detector 105, determiner 106, and output controller 107.

The image acquirer 101 acquires the correct-answer image data serving as a comparison target and the examination target image data. Specifically, the image acquirer 101 acquires the correct-answer image data pre-stored on the image DB 801 (see FIG. 2) in the storage 13. As described above, the correct-answer image data, after being generated or acquired by the client terminal 50, is transmitted to the image processing apparatus 10 as a print target.

The character region extractor 102 extracts the regions of characters respectively included in the correct-answer image data, acquired by the image acquirer 101, and the examination target image data. Specifically, the character region extractor 102 acquires the regions of the characters from tag information on the correct-answer image data, analysis results of the correct-answer image data, or analysis results of the examination target image data. The analysis of the correct-answer image data and the analysis of the examination target image data may be performed by artificial intelligence (AI).

The size acquirer 103 operates as an acquirer and thus acquires information indicating the size of the external shape of each of the characters included in the character regions extracted by the character region extractor 102. The information indicating the size of the external shape of each of the characters includes, for example, information indicating whether a font size as a value indicating the size of the external shape of the character is equal to or smaller than a predetermined threshold.

In accordance with the information indicating the size of the external shape of each of the characters acquired by the size acquirer 103, the detection condition setter 104 sets a condition (hereinafter referred to as a "detection condition") used to detect a difference between the correct-answer image data and examination target image data. Specifically, the detection condition setter 104 sets the detection condition in accordance with information indicating whether a font size is equal to or smaller than a predetermined size. The detection condition is stored in association with the information indicating the size of the external shape of the character on the detection condition DB 802 (see FIG. 2) in the storage 13. The detection condition is specifically described with reference to FIG. 6.

If the font size of the character is equal to or smaller than the predetermined size, the detection condition setter 104 may set a detection condition that allows the difference between the correct-answer image data and examination target image data to be detected more easily than a detection condition used to detect characters larger than the predetermined size.

For example, if the font size of the character is equal to or smaller than the predetermined size, the detection condition setter 104 may set a detection condition that allows an edge of a character to be more easily recognized than the detection condition used to detect the characters larger than the predetermined size. If the font size of the character is equal to or smaller than the predetermined size, the detection condition setter 104 may set a detection condition having a higher pixel value recognized as part of a character than the detection condition used to detect the characters larger than the predetermined size.

For example, if the font size of the character is equal to or smaller than the predetermined size, the detection condition setter 104 may set a detection condition that is used to detect a difference different from a difference detected through the detection condition used to detect the characters larger than the predetermined size. The detection condition setter 104 may set a detection condition that detects, as the difference different from the difference detected through the detection condition used to detect the characters larger than the predetermined size, a pixel that is among pixels forming a character included in the correct-answer image data but is not among pixels forming a character included in the examination target image data.

Using the detection condition set by the detection condition setter 104, the difference detector 105 performs control to detect the difference between the correct-answer image data and examination target image data. An operation to control the detection of the difference between the correct-answer image data and examination target image data may also be hereinafter referred to as a "difference detection process." The difference between the correct-answer image data and examination target image data to be detected by the difference detector 105 may be attributed to a fault, such as a "smudge," "white void," or "blur." The difference detected by the difference detector 105 and the specific example of the fault in the printing process are described below with reference to FIG. 6.

The determiner 106 determines the presence or absence of a fault in the printing process of the image processing apparatus 10. Specifically, the determiner 106 determines on a per character basis the presence or absence of the fault in the printing process in accordance with the difference detected by the difference detector 105. The determiner 106 thus determines the presence or absence of the fault in the printing process of the image processing apparatus 10.

The output controller 107 performs control to output determination results of the determiner 106. Specifically, the output controller 107 performs control to transmit the determination results to the client terminal 50 and cause the client terminal 50 to output the determination results.

Processes of Image Processing Apparatus

Figure 4:
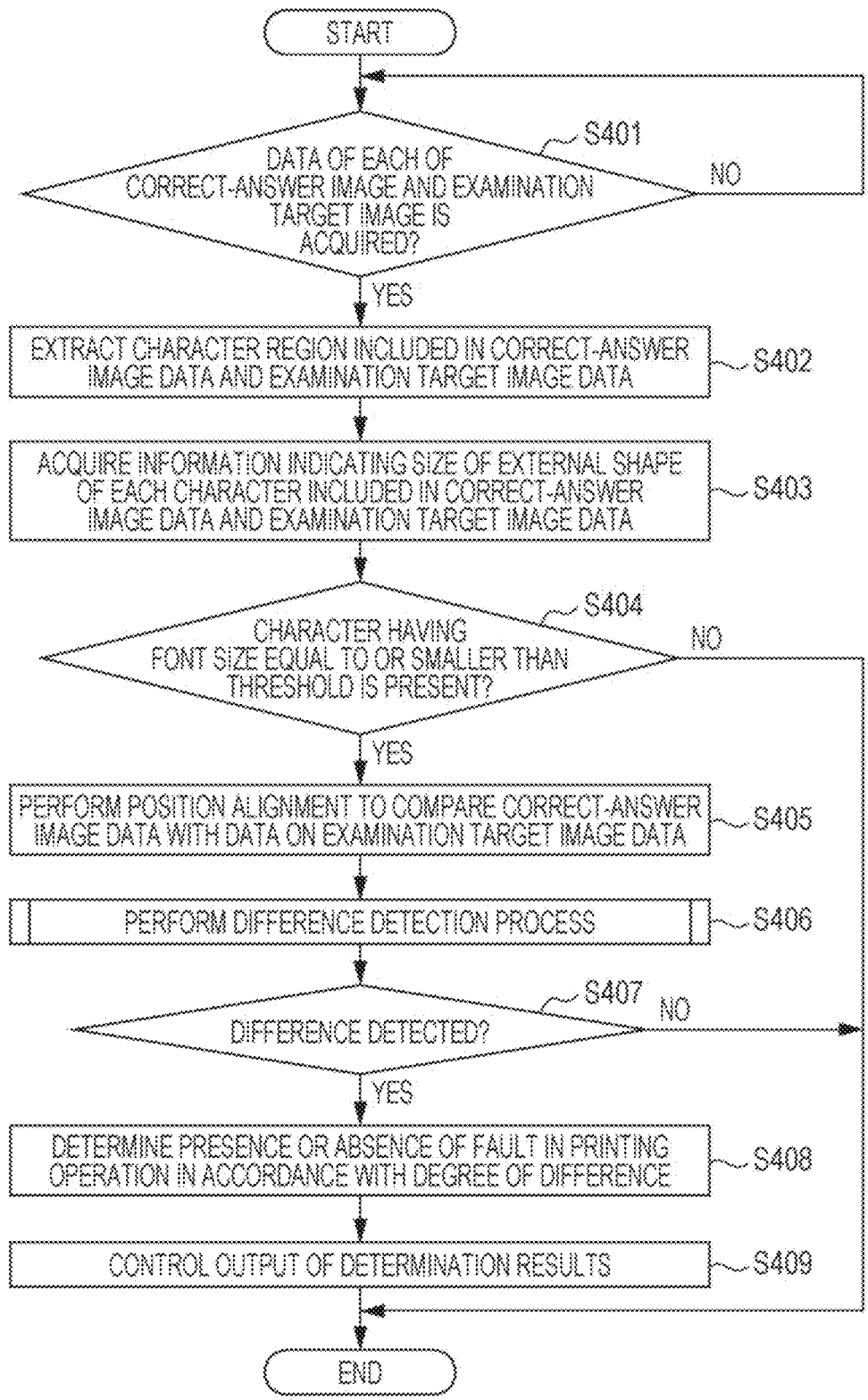
FIG. 4 is a flowchart illustrating a flow of an entire process of the image processing apparatus.

FIG. 4 is a flowchart illustrating a flow of an entire process of the image processing apparatus 10. In response to the acquisition of the data on a correct-answer image and an examination target image (yes path in step S401), the image processing apparatus 10 extracts a character region included in the correct-answer image data and examination target image data (step S402), and acquires information indicating the size of the external shape of each character included in the correct-answer image data and examination target image data (step S403). Specifically, the image processing apparatus 10 acquires the information indicating the font size of each character included in the correct-answer image data and examination target image data. In contrast, if the correct-answer image data and examination target image data have not yet been acquired (no path in step S401), the image processing apparatus 10 iterates the operation in step S401 until the correct-answer image data and examination target image data are acquired.

If a character having a font size equal to or smaller than a threshold is present in the correct-answer image data and examination target image data (yes path in step S404), the image processing apparatus 10 performs position alignment to compare the correct-answer image data with the examination target image data (step S405) and performs the difference detection process (step S406). The difference detection process is described in greater detail below with reference to FIG. 5. In contrast, if the character having the font size equal to or smaller than the threshold is not present in the correct-answer image data and examination target image data (no path in step S404), the process ends. Upon detecting the difference as the results of the difference detection process (yes path in step S407), the image processing apparatus 10 determines the presence or absence of a fault in the printing process on a per character basis in accordance with the degree of the detected difference (step S408) and performs control to output the determination results (step S409). If the difference is not detected as the results of the difference detection process (no path in step S407), the process ends.

Figure 5:
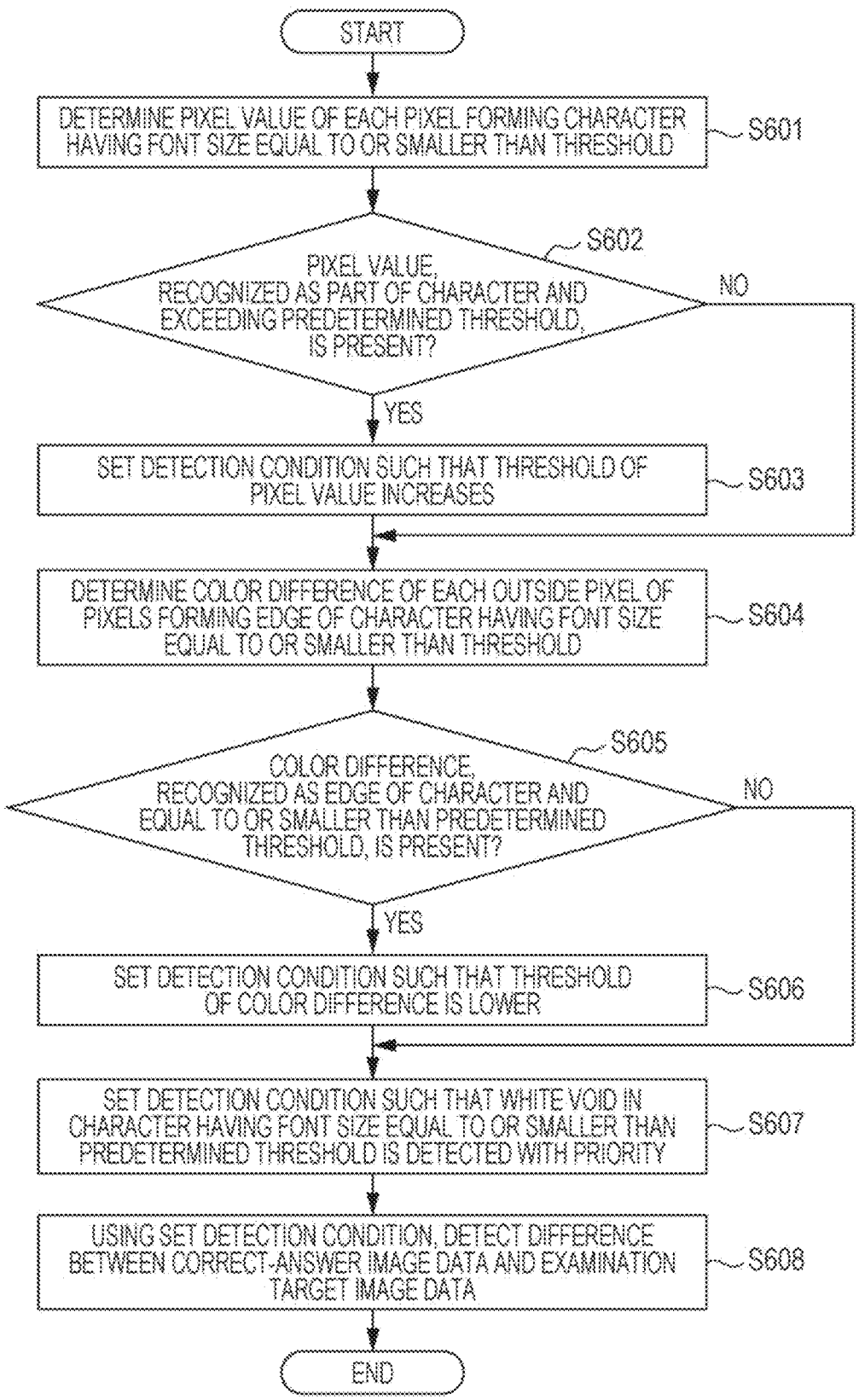
FIG. 5 is a flowchart illustrating a flow of a difference detection process out of the processes of the image processing apparatus.

FIG. 5 is a flowchart illustrating the flow of the difference detection process among the processes performed by the image processing apparatus 10. The difference detection process in step S406 in FIG. 4 detects the difference between the correct-answer image data and examination target image data and is performed in accordance with the flow illustrated in FIG. 5. The image processing apparatus 10 determines the pixel value of each pixel forming a character having a font size equal to or smaller than a predetermined threshold and included in the examination target image data (step S601). If there is a pixel recognized as part of the character and having a pixel value exceeding the predetermined threshold (yes path in step S602), the image processing apparatus 10 sets the detection condition such that the threshold of pixel values increases (step S603). If there is not any pixel recognized as part of the character and having a pixel value exceeding the predetermined threshold (no path in step S602), the process proceeds to step S604.

The image processing apparatus 10 determines a color difference of each outside pixel of pixels forming an edge of the character included in the examination target image data and having a font size equal to or smaller than a predetermined threshold (step S604). If a pixel having a color difference, recognized as the edge of the character and being equal to or smaller than the predetermined threshold, is present among the pixels (yes path in step S605), the image processing apparatus 10 sets the detection condition such that the threshold of the color differences is lower (step S606). If the pixel having the color difference, recognized as the edge of the character and being equal to or smaller than the predetermined threshold, is not present among the pixels (no path in step S065), the image processing apparatus 10 proceeds to step S607.

The image processing apparatus 10 sets the detection condition such that a white void is detected with a higher priority in a character included in the examination target image data and having a font size equal to or smaller than a predetermined threshold (step S607). Using the set detection condition, the image processing apparatus 10 detects a difference between the correct-answer image data and examination target image data (step S608). The difference detection process is thus complete and the process proceeds to step S407 in FIG. 4.

Specific Examples of Detection Condition

FIG. 6 illustrates a specific example of the relationship between the threshold of the size of the external shape of the character and the set detection condition of the difference. As described above, the detection condition of the difference between the correct-answer image data and examination target image data is associated with information indicating the size of the external shape of the character and then stored on the detection condition DB 802 (see FIG. 2) in the storage 13 in the image processing apparatus 10. FIG. 6 illustrates an example of the information stored on the detection condition DB 802. A title item denoted by "character size threshold" in FIG. 6 stores a threshold of the font size of the character as the information indicating the size of the external shape of the character. A title item denoted by "detection condition of difference when character size is equal to or smaller than threshold" stores contents of the set detection condition.

A first row below the title items in FIG. 6 associates information, indicating that the character size threshold is 8-point, with information indicating that the detection condition of difference with the character size being equal to or smaller than the threshold is "difference is set to be easier to recognize." This signifies that the detection condition is set such that the difference is detected more accurately in characters having a smaller font size than in characters having a larger font size. Specifically, the detection condition used to detect characters having an 8-point font size or smaller is set such that the difference between the correct-answer image data and examination target image data is more easily detected than in the detection condition used to detect characters having a font point larger than 8-point font size. The detection condition set in this way may control detection failure of faults in the characters having the smaller font size.

A second row below the title items in FIG. 6 associates information, indicating that the character size threshold is 8-point, with information indicating that the detection condition of difference with the character size being equal to or smaller than the threshold is "edge of character is extracted more accurately." Since characters having a smaller font size are affected more by a recognition failure of an external edge of a character when the examination target image is read, a detection condition more easily recognizing the external edge of the character is set. Specifically, if the font size is 8-point or smaller, the detection condition used to recognize more easily the edge of the character is set instead of the detection condition used to detect characters larger than the 8-point font size. Such a detection condition set may increase the accuracy of determining a fault in a character of a size that is affected more by a recognition failure of the external edge of the character when the examination target image is read.

A third row below the title items in FIG. 6 associates information, indicating that the character size threshold is 8-point, with information indicating that the detection condition of difference with the character size being equal to or smaller than the threshold is "threshold of pixel value of pixel recognized as part of character is increased." A character having a smaller font size may be as faint as mid-tone, even though the character is black. The detection condition to be set causes a range of pixel values recognized as part of the character to be widened. Specifically, if the font size is 8-point or smaller, the detection condition having a higher pixel value recognized as part of the character is set instead of the detection condition used to detect a character having a font size larger than an 8-point. Such a detection condition set may increase the accuracy of determining a fault in a character of a size that becomes as faint as mid-tone even if the character is black.

A fourth row below the title items in FIG. 6 associates information, indicating that the character size threshold is 8-point, with information indicating that the detection condition of difference with the character size being equal to or smaller than the threshold is "white void is detected." A character having a smaller font size is likely to have a missing portion in the form of a tiny "white void," the detection condition used to detect the white void is set with a higher priority.

For example, the difference detected through the detection condition used to detect characters having a font size larger than 8-point may be caused by a "blur." If the font size is 8-point or smaller, the detection condition detecting the difference caused by a "white void" rather than a "blur" is set with a higher priority. In this case, if the font size is 8-point or smaller, there is used a detection condition detecting a difference (for example, such as attributed to a "white void"), different from a difference (such as attributed to a "blur") detected through a detection condition used to detect a character having a font size larger than 8-point. The use of such a detection condition set may allow a fault having a greater effect to be detected with a higher priority in response to the font size of the character.

FIG. 7 illustrates a specific example of a difference detected by the image processing apparatus 10 and a fault in the printing process. Referring to FIG. 7, a row denoted "above threshold" below a title item denoted by "character size" lists a specific example of each of an "correct-answer image" and an "examination target image" of characters having a font size above a threshold and a specific example of the difference detected through a predetermined detection condition. A row denoted by "equal to or smaller than threshold" below the title item denoted by the "character size" lists a specific example of each of an "correct-answer image" and an "examination target image" of characters having a font size equal to or smaller than a threshold and a specific example of the difference not detected through a predetermined detection condition.

A character region included in the data of an image serving as a detection target includes "8.24." The difference of each of four characters "8," ". (decimal point)," "2," and "4" included in the character region is detected. A white void and blur may now occur in the ". (decimal point)" out of the four characters. If the font size exceeds the threshold, "8.24" is recognized as illustrated in an "examination target image" even though the white void and blur occur in multiple pixels forming the ". (decimal point)" at the bottom right portion as illustrated in an "expanded view of decimal point". No information missing problem may thus occur.

In contrast, if the font size is equal to or smaller than the threshold and the white void and blur occur in multiple pixels forming the ". (decimal point)" at the bottom right portion as illustrated in the "expanded view of decimal point", "8.24" is difficult to recognize. The information missing problem may thus occur. Specifically, if the white void occurs with the font size equal to or smaller than the threshold, the ratio of the region of the white void to one character region increases. A character, such as ". (decimal point)," has an external shape relatively smaller than other characters and may thus suffer entirely from the white void. In such a case, "8.24" may possibly recognized as "824", leading to information missing.

If a blur occurs in a character with the font size being equal to or smaller than the threshold, the entire character becomes fainter because of reading characteristics during the reading of smaller characters. Depending on the contents of the detection condition used to detect the blur, the difference as a detection target may escape detection. In such a case, the character may be difficult to recognize as "8.24" and the information missing problem may possibly occur. For example, the threshold of a color difference preset for the edge of a character in difference extraction may now be "60" and the color difference between the edge of ". (decimal point)" of a correct-answer image and the edge of ". (decimal point)" of an examination target image may now be "40." In such a case, since the color difference between the edge of ". (decimal point)" of the correct-answer image and the edge of ". (decimal point)" of the examination target image is smaller than the threshold, the difference is not detected. In particular, a dot character, such as ". (decimal point)," has an external shape relatively smaller than other characters and is a tiny portion of the edge (or the edge itself). The color difference of the edge may be considered the color difference of the character.

A character having the font size equal to or smaller than the threshold is automatically modified such that the threshold of the color difference preset for the edge of the character in the difference extraction is lower. For example, the threshold of the color difference preset for the edge of the character in the difference extraction is automatically modified from "60" to "35." In this way, even if the color difference between the edge of ". (decimal point)" of the correct-answer image and the edge of ". (decimal point)" of the examination target image is "40," the detection error may be controlled.

The exemplary embodiment has been described. The disclosure is not limited to the exemplary embodiment described above. The effect of the disclosure is not limited to the effect of the exemplary embodiment described above. The configuration of the information processing system 1 in FIG. 1 and the hardware configuration of the image processing apparatus 10 in FIG. 2 have been described as non-limiting examples. The functional configuration of the image processing apparatus 10 in FIG. 3 has also been described as a non-limiting example. It is sufficient if the information processing system 1 in FIG. 1 is equipped to perform the function enabled to execute the whole process described above. The functional configuration to execute the function is not limited to the functional configuration in FIG. 3.

The order of steps in the processes of the image processing apparatus 10 in FIGS. 4 and 5 has also been described as a non-limiting example. The processes are performed in the order of the steps in a time-series manner. Alternatively, the steps may be performed in parallel or individually. The specific example of the difference detection process illustrated in FIGS. 6 and 7 has been described as a non-limiting example.

According to the exemplary embodiment, when the detection condition of the difference is set, information indicating whether the font size of the character is equal to or smaller than the predetermined size is used as information indicating the size of the external shape of the character. Specifically, one font size of the characters serving as a threshold is determined. The detection condition is thus changed from one to another at the threshold. The disclosure is not limited to this setting. For example, multiple font sizes of characters serving as thresholds are determined and the detection condition is changed in a stepwise fashion in response to the font size of the characters.

According to the exemplary embodiment, the paper sheet to be read by the image processing apparatus 10 is the paper sheet printed by the image processing apparatus 10. The disclosure is not limited to this setting. The paper sheet to be read by the image processing apparatus 10 may have been printed by another image processing apparatus 10. In such a case, the correct-answer image data is acquired via a server (not illustrated) or an external storage device from the image processing apparatus 10 having printed or from the client terminal 50 having generated first the correct-answer image data.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
   acquire information indicating a size of an external shape of each of characters in data of a first image and data of a second image that are used for comparison; and
   determine a presence or absence of a fault in the data of the second image with respect to each of the characters with reference to a degree of a difference that is between the data of the first image and the data of the second image and is detected in accordance with a detection condition varying in response to the size of the external shape of each of the characters,
   wherein the processor is configured to:
   perform control to detect the difference on a per character basis using the detection condition identified depending on whether a font size of the character, as the information indicating the size of the external shape of the character, is equal to or smaller than a predetermined size, and
   if the font size is equal to or smaller than the predetermined size, use a detection condition having a higher pixel value recognized as part of the character than the detection condition used for a character larger than the predetermined size.

2. An information processing system comprising:
   an acquirer that acquires information indicating a size of an external shape of each of characters in data of a first image and data of a second image that are used for comparison;
   a determiner that determines a presence or absence of a fault in the data of the second image with respect to each of the characters with reference to a degree of a difference that is between the data of the first image and the data of the second image and is detected in accordance with a detection condition varying in response to the size of the external shape of each of the characters; and
   a controller that performs control to detect the difference on a per character basis using the detection condition identified depending on whether a font size of the character, as the information indicating the size of the external shape of the character, is equal to or smaller than a predetermined size,
   wherein, if the font size is equal to or smaller than the predetermined size, the system uses a detection condition having a higher pixel value recognized as part of the character than the detection condition used for a character larger than the predetermined size.

3. A non-transitory computer readable medium storing a program causing a computer to execute a process, the process comprising:
   acquiring information indicating a size of an external shape of each of characters in data of a first image and data of a second image that are used for comparison;
   determining a presence or absence of a fault in the data of the second image with respect to each of the characters with reference to a degree of a difference that is between the data of the first image and the data of the second image and is detected in accordance with a detection condition varying in response to the size of the external shape of each of the characters;
   performing control to detect the difference on a per character basis using the detection condition identified depending on whether a font size of the character, as the information indicating the size of the external shape of the character, is equal to or smaller than a predetermined size; and
   if the font size is equal to or smaller than the predetermined size, using a detection condition having a higher pixel value recognized as part of the character than the detection condition used for a character larger than the predetermined size.

* * * * *